March 10, 1964  R. E. COX  3,124,278
GRAVITY FLOW DISTRIBUTOR FOR GRANULAR MATERIAL
Filed April 10, 1961  3 Sheets-Sheet 1

INVENTOR.
REX E. COX
BY
Tristan Miller
ATTORNEY.

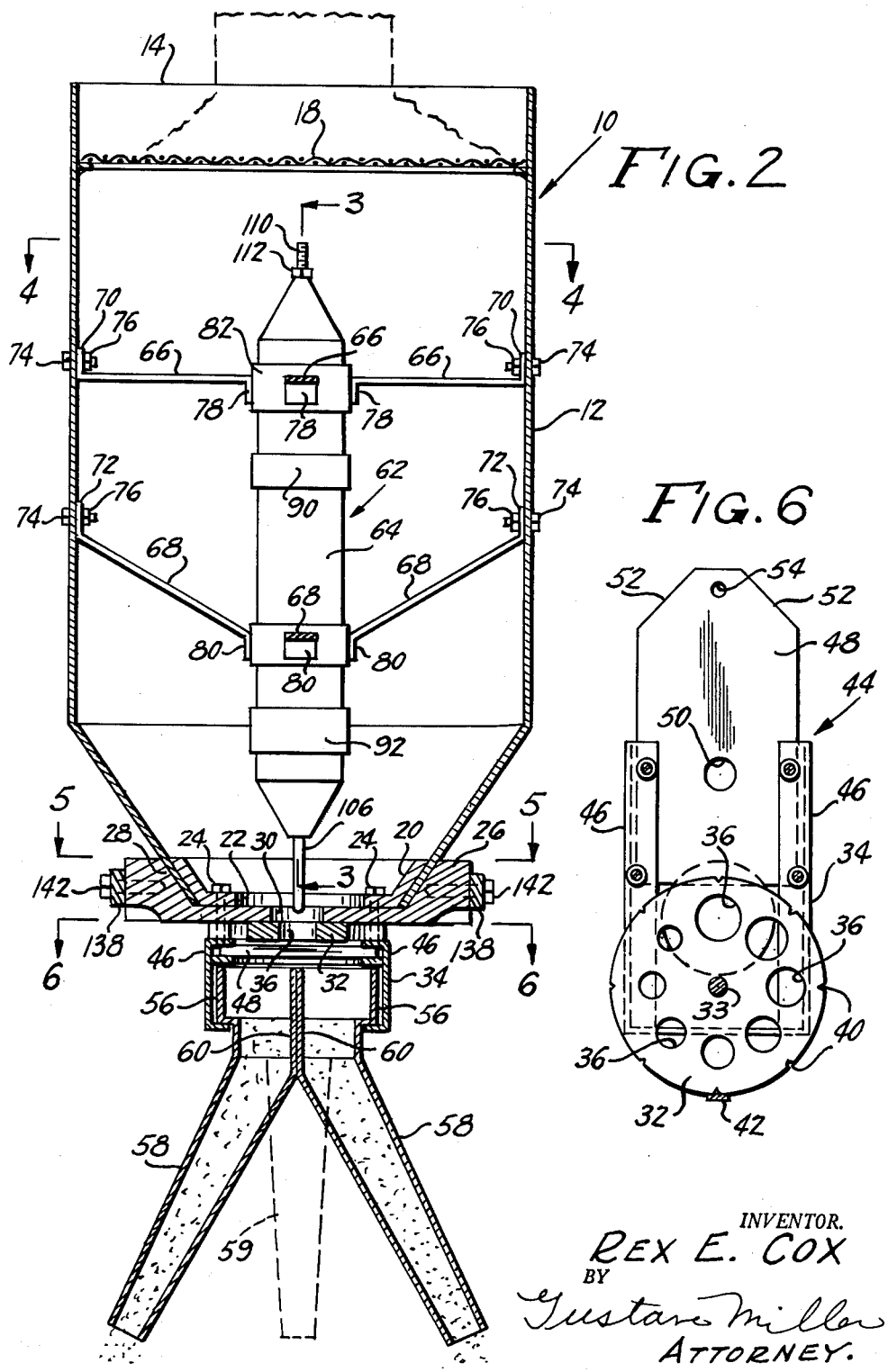

March 10, 1964  R. E. COX  3,124,278
GRAVITY FLOW DISTRIBUTOR FOR GRANULAR MATERIAL
Filed April 10, 1961  3 Sheets-Sheet 3
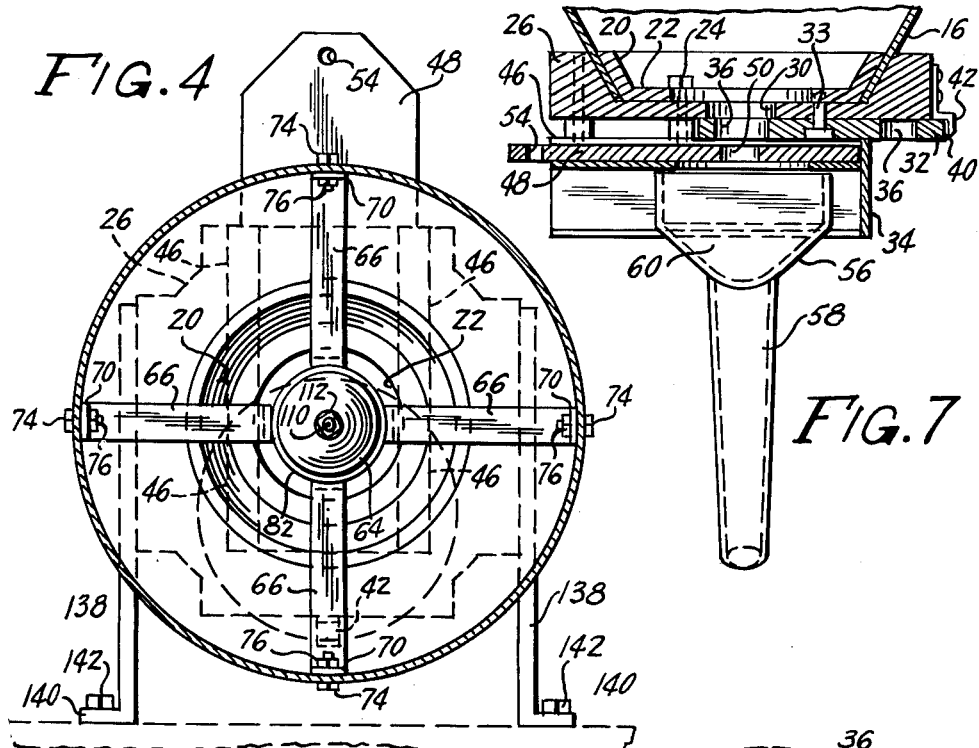
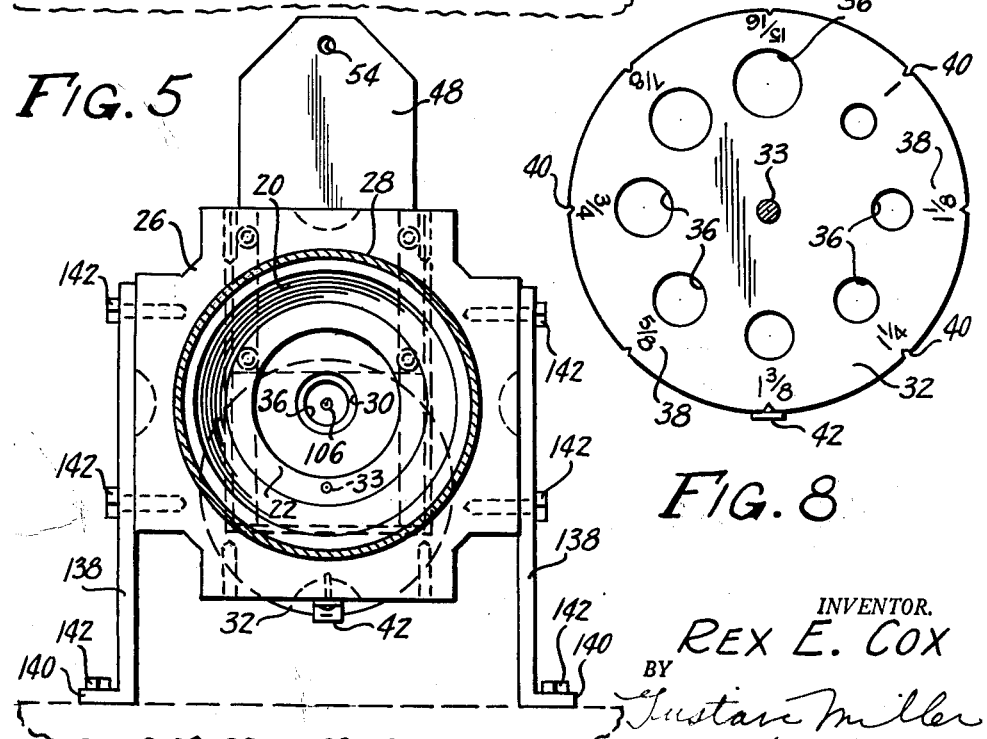
INVENTOR.
REX E. COX
BY Gustave Miller
ATTORNEY.

United States Patent Office 3,124,278
Patented Mar. 10, 1964

3,124,278
GRAVITY FLOW DISTRIBUTOR FOR GRANULAR MATERIAL
Rex E. Cox, P.O. Box 81, Dilley, Tex.
Filed Apr. 10, 1961, Ser. No. 101,877
9 Claims. (Cl. 222—196)

This invention relates to a gravity flow distributor for fertilizer or the like, and it particularly relates to a distributor for granular type chemical fertilizers or the like.

Heretofore, conventional type distributors generally comprised a hopper, base, chains, sprockets, bearings and shafts in addition to varied kinds of wheels and the like within the hopper for expelling the fertilizer through an opening having a slide door to regulate the rate of flow. These prior type distributors usually worked adequately under ideal conditions but on humid days, the granular particles, and particularly the "fines" tended to become moist and sticky. These sticky particles soon adhered together sufficiently to clog up the mechanism causing, at first, a retarded rate of flow, and then eventually a complete stoppage if conditions were bad enough. Furthermore, not only did these moisture-packed particles interfere with the flow of fertilizer material but they actually caused breakdown of the moving parts of the mechanism because of increased friction and jamming of the parts. They also resulted in a reduction of the size of the base orifice opening because of a gradual build-up of adhesively-packed particles around the orifice.

It is one object of the present invention to overcome the aforesaid disadvantages by providing a distributor which has a minimum of internal moving parts, thereby reducing the deleterious effects of clogging of moisture-packed particles.

Another object of the present invention is to provide a distributor, of the aforesaid type, which prevents adherence of sticky particles around the base orifice.

Another object of the present invention is to provide a gravity flow distributor, of the aforesaid type, which is adapted to regulate the rate of flow of fertilizer or the like at predetermined rates.

Another object of the present invention is to provide a gravity flow distributor, of the aforesaid type, which is adapted to stop and start the flow of fertilizer or the like in accordance with the movement of the carrier.

Other objects of the present invention are to provide an improved distributor, of the character described, that is easily and economically produced, which is sturdy in construction, and which is highly efficient in operation.

With the above and related objects in view, the present invention consists in the details of construction and combination of parts, as will be more fully understood from the following description, when read in conjunction with the accompanying drawings in which:

FIG. 2 is a sectional view taken on line 2—2 of FIG. 1.

FIG. 4 is a sectional view taken on line 4—4 of FIG. 2.

FIG. 5 is a sectional view taken on line 5—5 of FIG. 2.

FIG. 6 is a sectional view taken on line 6—6 of FIG. 2.

FIG. 7 is an enlarged fragmentary view through the discharge valve assembly at the bottom of the distributor.

FIG. 8 is a bottom view of the orifice adjusting disc.

Figure 1:
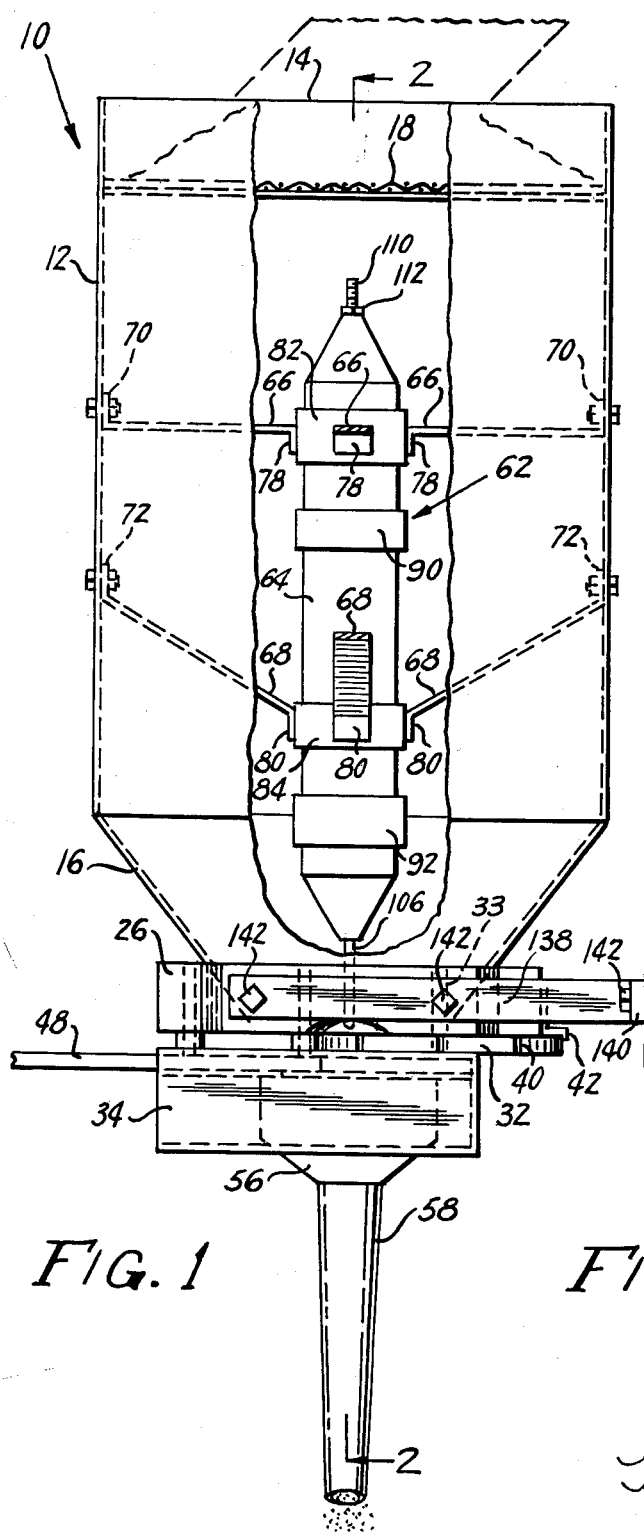
FIG. 1 is a side elevational view of a distributor embodying the present invention, parts broken away to reveal the interior of the hopper.
Figure 3:
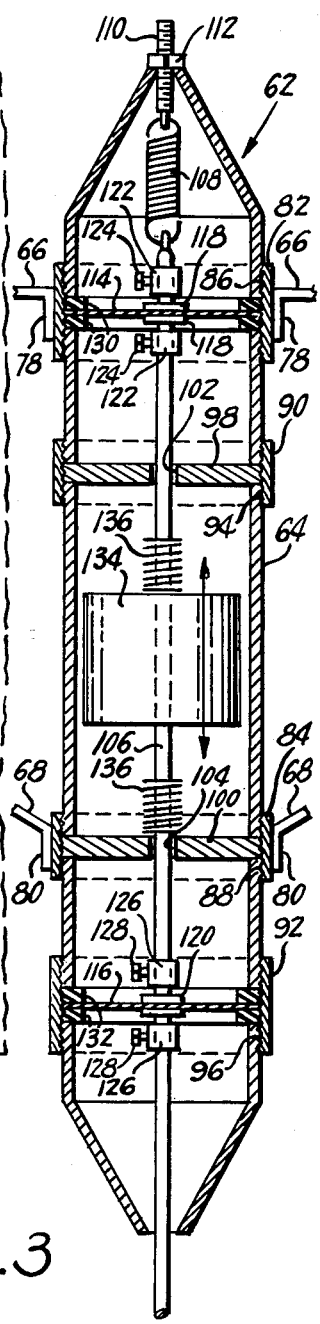
FIG. 3 is a sectional view taken on line 3—3 of FIG. 2.

Referring in greater detail to the drawings wherein similar reference characters refer to similar parts, there is shown a distributor, generally designated 10, comprising a hopper 12 having an open top 14 and an inwardly-tapered, funnel-shaped bottom 16. The open top 14 is closed by a screen 18 of a predetermined mesh size, while the funnel-shaped bottom 16 is open at its lower end and within this lower end is positioned a wedge-shaped, annular adaptor 20. This adaptor 20 is releasably held within the lower end of bottom 16 by its own wedging engagement and is provided with a lower lateral flange 22 having openings through which extend bolts 24. These bolts 24 secure the adaptor 20, and therefore also the hopper 12, to a base member 26 which is provided with a tapered recess 28 within which the bottom 16 rests.

The base 26 is provided with a central orifice 30, and a flow control disc 32 is rotatably positioned on a stub shaft 33 below this orifice 30 with the shaft 33 in eccentric relationship to the hopper bottom 16. The disc 32 is rotatably retained in its position between the base member 26 and a spout housing 34 and is provided with an annularly spaced series of apertures 36. These apertures 36 vary in diameter so as to vary the effective size of orifice 30 of the base 26. The largest aperture 36 is illustrated in FIGS. 6 and 8 in the 12 o'clock position and is of substantially the same diameter as the orifice 30. In the 12 o'clock position, the apertures 36 each mate with the orifice 30. The rate of flow of the granular material from the hopper 12 is varied in accordance with the aperture 36 which is in register with the orifice 30, and this variation is accomplished by rotating the disc 32 to the desired position.

The disc 32 is provided with numerals 38 corresponding to the apertures 36. These numerals 38 are scale marks which, when exposed to view, show the size of the aperture 36 which is arranged in a position diametrically opposite the orifice-aligned position. In other words, the numeral 1⅜ shown at the 6 o'clock position in FIG. 8 indicates the size of the aperture 36 in the 12 o'clock position and vice versa.

V-notches 40 in the edge of the disc 32 correspond to the various apertures 36 and are provided for engagement by a spring latch 42 on the base member 26 (see FIG. 7) in order to releasably retain the disc 32 in its various positions of rotational adjustment.

Within the upper portion of the housing 34 is provided a slide valve assembly, generally designated 44 (see FIG. 6) which comprises a pair of laterally-extending channel tracks 46 between which is slidably positioned a slide plate 48. The plate 48 is provided with a hole 50 and is beveled at the outer edges 52 to form a handle portion with a finger-hole 54. The plate 48 is slidable into a position where the hole 50 mates with the orifices 30 and 36 (as in FIG. 7) to permit distribution of the granular material, or is slidable to move the hole out of such mating position to cut off the granular flow. Although this is the preferable construction, the plate 48 may also be made imperforate, that is, with the hole 50 eliminated, in which case, the movement of the plate's inner edge away from the orifices 30 and 36 would be required to permit granular flow. The use of the hole 50 is preferable, however, because it permits movement of the plate 48 in opposite directions to close and open the base orifice 30.

Positioned within the housing 34, below the valve assembly 44, is a funnel 56 from which depends a pair of oppositely-inclined or divergent nozzles or spouts 58. The upper ends of the nozzles or spouts 58 are straight and their inner upper sides 60 are in face-to-face contact to provide a separating wall acting as a stream divider. This stream divider permits equal distribution of the granular material from the hopper 12 between the nozzles 58. The divergence of the nozzles 58 permits distribution of the material on opposite sides of the machine.

Within the hopper 12 is an agglomerate-preventer, generally designated 62. This agglomerate-preventer is utilized to prevent agglomeration of sticky, moisture-laden particles in the base orifice 30 and comprises an elongated, tubular housing 64 which is retained in vertical position spaced from the walls of the hopper 12 by means of braces 66 and 68 having flanges respectively designated 70 and 72 at their outer ends and bolts 74 and nuts 76 connecting these flanges 70 and 72 to the hopper walls. At their inner ends, the braces 66 and 68 are provided with flanges 78 and 80 respectively, these flanges 78 and 80 being welded, riveted, or otherwise secured to collars respectively designated 82 and 84, these collars 82 and 84 being internally threaded to connect at 86 and 88 respectively with complementary threads on the exterior of the housing 64 made up of several sections which are held together by the collars 82 and 84 as well as by similar collars 90 and 92 which mate with complementary threads on the housing 64, as at 94 and 96 respectively.

The collars 88 and 90 hold the adjacent ends of the housing 64 clamped against respective discs 98 and 100. These discs 98 and 100 are centrally apertured, as at 102 and 104 respectively, to permit the passage of a vertical rod 106 for which they act as guides.

The rod 106 is suspended at its upper end from a coil spring 108 which is itself connected to an adjusting screw or threaded rod 110 extending through a threaded nut 112 in the top of the housing 64. The screw or rod 110 is threadedly adjustable in a vertical direction to vary the tension or compression of the spring 108.

Adjacent the upper and lower portions of the housing 64, the rod 106 passes through a pair of diaphragms 114 and 116 respectively. These diaphragms 114 and 116 are constructed of flexible material such as rubber or the like, and are clamped at their inner peripheral areas by washers 118 for diaphragm 114 and by washers 120 for diaphragm 116. Adjustable collars 122 with adjusting set-screws 124 are provided at opposite sides of diaphragm 114 and adjustable collars 126 with adjusting set-screws 128 are provided at opposite sides of diaphragm 116. The diaphragm 114 is clamped at its outer periphery by rings 130 retained between the housing sections by means of the collar 82 which is threadedly engaged with the housing sections. The diaphragm 116 is similarly retained at its outer periphery between rings 132 retained between the housing sections by the collar 92.

A weight 134 is connected to the median portion of the rod 106 and on either side of the weight 134 there is provided a shock absorbing spring 136. If desired, the springs 136 can be replaced by soft rubber blocks or the like.

The base member 26, which supports the hopper 12, spouts 58 and the accompanying apparatus, is itself supported on the plow or other vehicle for dispensing the granular material by means of bracket bars 138 having flanges 140 at their free ends. These flanges 140 are connected to the plow or other vehicle by means of bolts or the like, indicated at 142, and passing through the flanges 140. The bars 138 are themselves connected to the base member 26 by screws or the like 142.

Although a double spout assembly has been illustrated at 58, if desired, only one spout may be used, as at 59. In such case, the dividing walls 60 would be eliminated. On the other hand, more than two spouts may also be used, if desired, and corresponding dividing walls can then be used to correspond to the number of spouts utilized.

In the operation of the above-described apparatus, the slide valve plate 48 is generally rigged up with pulleys, cables and springs which are operatively connected to the drive mechanism of the plow, tractor or the like. Usually such vehicles are constructed to throw the vehicle out of gear when the plow is raised off the ground during turning of the vehicle. When this happens, the connection with the slide valve plate 48 can be such that the plate 48 is moved in one direction or the other to bring its opening 50 out of alignment with the orifice 30 thereby cutting off the flow of granular material. When the turn is made, the plate 48 is then automatically moved to bring the hole 50 back into open position. In addition to such automatic operation, the valve plate 48 may be manually adjusted into open or closed position, as desired.

During the operation, the vibration of the vehicle will cause the rod 106 to move up and down, with the spring 108 biasing it upwardly and the weight 134 biasing it downwardly. This causes the lower end of the rod 106 to constantly reciprocate through the orifice 30 and into and out of orifice 36, thereby preventing any accumulation and adherence of sticky particles which might tend to clog these orifices.

Actually, the function of the rod 106 is to reciprocate for the purpose of preventing the dry particles of fertilizer, that is, the coarse granules, from bridging, which they have a natural tendency to do in flowing through a small opening. In preventing this bridging, the flow is kept constant. This constant flow solves the trouble which would otherwise be caused by the finer moist particles, since this flow of the coarser granules prevents the fine moist particles from adhering to the orifice "wall area" in the "thin" regulator disc. This rod, therefore, tends to make the regulator disc orifice "self cleaning" by the continuous flowing action of the coarse granules, which constant flow the reciprocating rod promotes.

The effective size of the orifice 30 is, as described above, first predetermined by a selective setting of the disc 32 to bring the desired orifice 36 into register with the orifice 30.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A gravity flow distributor for granular material comprising a hopper assembly, a spout assembly, valve means between said hopper assembly and spout assembly, an orifice in said hopper assembly in register with the spout assembly, and means in said hopper assembly for preventing adhesion of particles in said orifice, said last-mentioned means comprising an elongated vertical tubular housing, openings at opposite ends of said tubular housing, said openings being aligned with said orifice, a rod extending from the interior of said tubular housing, through the lower opening, into said orifice, said rod being suspended from a spring at its upper end, said spring being suspended from an adjustable threaded rod in the upper opening, a weight mounted on said rod within said tubular housing, and flexible diaphragm means encompassing said rod within said tubular housing.

2. The gravity flow distributor of claim 1, said hopper assembly comprising a base member, a hopper, means for securing said hopper on said base member, said hopper having an inwardly flaring open bottom end, said base and hopper securing means comprising an apertured plate having an outwardly flaring flange complementary to the inwardly flaring bottom end of said hopper, said base member having a recess complementary to the outer bottom wall of said hopper and bolt means securing said base member and said plate together.

3. The gravity flow distributor of claim 2, said hopper being open at the end opposite said base member and having a screen of predetermined mesh size closing said open end.

4. The gravity flow distributor of claim 2, said spout assembly comprising a plurality of nozzles depending from a housing connected to said base member, said nozzles being separated from each other within said housing by partitions and being divergent from each other outside said housing.

5. The gravity flow distributor of claim 1, said valve means comprising a slide plate movable between said orifice and said spout assembly, said slide plate having an aperture therein adapted to register with said orifice in accordance with the slidable position of said slide plate.

6. The gravity flow distributor of claim 1, and shock absorbing means at opposite sides of said weight within said housing.

7. The gravity flow distributor of claim 1, said tubular housing being constructed of a plurality of sections, said sections being releasably coupled by means of internally threaded collars engaged with external threads on mating portions of said housing sections.

8. The gravity flow distributor of claim 1, said spout assembly comprising a plurality of nozzles separated at their upper ends by partition means to divide the flow of granular material from said orifice between said nozzles, said nozzles being divergent from each other at their lower ends.

9. The gravity flow distributor of claim 1, and means operatively connected to said hopper assembly to selectively vary the effective diameter of said orifice comprising a disc rotatably mounted between said base and said housing on an axis which is eccentric relative to said base member, said disc having a series of spaced apertures of varying diameters located in an annulus having a radius equal to the distance between its said axis and said orifice in said base member, whereby said apertures are selectively registrable with said orifice in accordance with the rotational position of said disc.

References Cited in the file of this patent

UNITED STATES PATENTS

| | | |
|---|---|---|
| 1,457,721 | Wolf | June 5, 1923 |
| 2,044,326 | Pickell | June 16, 1936 |
| 2,123,450 | Brandt et al. | July 12, 1938 |
| 2,174,348 | Damond | Sept. 26, 1939 |
| 2,306,748 | Peterson | Dec. 29, 1942 |